(12) United States Patent
Fischer et al.

(10) Patent No.: US 6,279,557 B1
(45) Date of Patent: Aug. 28, 2001

(54) SPRAY BAR PAIR ASSEMBLY

(75) Inventors: James J. Fischer; James Jureski, both of Tyler, TX (US)

(73) Assignee: Specialty Motorsports, Inc., Tyler, TX (US)

( * ) Notice: Subject to any disclaimer, the term of this patent is extended or adjusted under 35 U.S.C. 154(b) by 0 days.

(21) Appl. No.: 09/634,127

(22) Filed: Aug. 8, 2000

Related U.S. Application Data
(60) Provisional application No. 60/150,200, filed on Aug. 20, 1999.

(51) Int. Cl.[7] ................................................ F02B 23/00
(52) U.S. Cl. .............................. 123/585; 123/590
(58) Field of Search ................................. 123/585, 590, 123/14; 261/118

(56) References Cited

U.S. PATENT DOCUMENTS

| D. 420,364 | 2/2000 | Fischer et al. .................. D15/9.1 |
| 5,699,776 | 12/1997 | Wood et al. ..................... 123/531 |
| 5,743,241 | 4/1998 | Wood et al. ..................... 123/531 |
| 5,839,418 | 11/1998 | Grant ............................... 123/585 |
| 5,890,476 | 4/1999 | Grant ............................... 123/585 |
| 5,967,099 | 10/1999 | Patrick ........................... 123/1 A |

*Primary Examiner*—Noah P. Kamen
(74) *Attorney, Agent, or Firm*—C. W. Alworth

(57) ABSTRACT

A spray bar pair for use in the performance car industry is disclosed. The spray bar pair may be installed in a spray bar plate for mounting in the air flow from the throttle valve and injects a well mixed mixture of fuel and gas into the intake manifold of an engine. The spray bar pair utilizes carefully a chosen pattern of spray apertures set at such angles in the spray bar pair to ensure proper mixing. Several methods of use for the improved spray bar pair are given.

16 Claims, 16 Drawing Sheets

SPRAY BAR PAIR ASSEMBLY

This application claims the benefit of U.S. Provisional Application No. 60/150,200, filed on Aug. 20, 1999.

TECHNICAL FIELD OF THE INVENTION

The present invention relates generally to an improvement to a spray bars used in conjunction with nitrous-oxide supplemental fuel systems employed in standard throttle and carburetor systems used in the performance racing industry.

BACKGROUND OF THE INVENTION AND PRIOR ART

Performance racing encompasses all areas of the sport of racing that includes drag racing, stock car racing, speedboat racing and such. Performance racing has become one of the major spectator sports in the United States and fans from all walks of life share in the sport both as spectators and participants. There are basically two types of participants—amateur and professional. It is the fact that amateurs can participate that has made performance racing such a popular sport. It should be noted that there is little difference between the amateur and professional: the real difference being that the amateur has other employment besides racing which helps fund his/her sport.

Simply put "performance" in performance racing means maximizing the horsepower from a given 'stock' engine. There are numerous methods, techniques, additions, etc. that are used to improve horsepower. These techniques range from boring out cylinders, increasing the compression ratio, modifying the inlet and exhaust manifolds (tuning), modifying pistons, changing fuels from gasoline to alcohol, etc. Probably the most popular technique for improving horsepower involves the addition of Nitrous Oxide—$N_2O$ to the engine fuel-air system. Nitrous Oxide (laughing gas—used by the dental industry as a anesthetic) provides oxygenation to regular fuel. Essentially the oxygen radical releases more readily to oxygenate the fuel then does the $O_2$ molecule in regular "air." It would be the same as injecting pure oxygen into the engine; however, $N_2O$ is much safer. Pure oxygen in direct contact with hydrocarbons spontaneously reacts (explodes); whereas, $N_2O$ and fuel requires a source of ignition.

There are several techniques used to add nitrous-oxide to the fuel-air system in an engine, although all of the techniques share a common mode. Essentially, the common mode is the engine's regular throttle or carburetor system coupled with a technique, method, or device to inject a metered combination of fuel and nitrous-oxide in to the engine, whenever the driver desires more horsepower (greater speed) from the engine. Throughout this disclosure, the term ancillary fuel will mean that fuel added to the engine for on-demand increased horsepower.

One method involves injecting a metered mix of ancillary fuel and nitrous-oxide into each cylinder on demand. Basically this method is simple fuel injection—a well known technique. It is very complex for the rank amateur to install such a system on a stock engine, because injection ports must be added to each cylinder on the engine. The addition of injection ports involves complex machining and places this approach out of the means of most amateur participants.

The popular technique involves the addition of a spray nozzle or spray bar system beneath the regular throttle body or carburetor between the throttle body or carburetor and the intake manifold to provide the mix of ancillary fuel and $N_2O$. The spray bar device is made up of two conduits each with a series of apertures mounted in a frame or plate (about ½-inch thick). One conduit is connected to a source of nitrous-oxide and the other conduit is connected to the source of fuel. Whenever the race driver desires increased horsepower, he/she presses a button in the driving compartment that opens a series of solenoid valves, which in turn pass fuel and nitrous-oxide to the spray bar pair. The fuel-nitrous-oxide mixture is then drawn through the intake manifold and into the engine cylinders where it is burnt.

The overall mixture of nitrous-oxide and fuel (provided by the spray bar) and air and fuel (provided by the carburetor) is critical to engine performance. The mixture must be properly metered and mixed to its stoichiometric peak. (In fact, this is true with fuel/air and fuel/nitrousoxide injection systems.) In order to achieve the stoichiometric peak, the plurality of apertures in the spray bar plate must be carefully sized and positioned. One of the more popular spray bar assemblies sprays the ancillary fuel orthogonally to the air/fuel flow coming from the carburetor while spraying the nitrous-oxide almost in-line with the fuel/air mixture and directly across the ancillary fuel flow.

Wood, U.S. Pat. No. 5,743,241 discloses a Nitrous Oxide Plate System, which shows the nitrous oxide (oxidizer) bar above the fuel bar. The nitrous oxide, like all the known prior art, is sprayed downwards from an emitter port or aperture towards a fuel emitter port or aperture. The actual angle from vertical that the emitter is positioned axially about the bar is not disclosed or claimed. The angle that the fuel emitter is axially positioned about the bar is shown as being orthogonal to the general air/fuel mix flow. Wood uses a minimum of four specially formed emitter ports; whereas, the instant invention uses plurality of laser drilled circular apertures or emitters for greater mixing. The fuel and oxidizer spray bars are shown, as in the prior art, to be touching each other.

Grant, U.S. Pat. No. 5,839,418 discloses a Dual Stage Nitrous Oxide and Fuel Injection Plate, which also shows the nitrous oxide bar above the fuel bar. Additionally, Grant discloses a "crossed set" of spray bar pairs. The nitrous oxide, like Wood and all known prior art, is sprayed downwards from an emitter port or aperture towards a fuel emitter port or aperture. Again, like Wood the actual angle is not disclosed or claimed. Like Wood, the fuel angle is shown as orthogonal to the general air/fuel mix flow. Like the prior art, the spray bar pairs touch or nearly touch each other.

Other prior art found by the inventors shows or discloses various fuel nozzles in which fuel and oxidizer are mixed and sprayed into the manifold. See for example U.S. Pat. No. 5,699,776 (Wood et al.), U.S. Pat. No. 5,890,476 (Grant), U.S. Pat. No. 5,967,099 (Patrick), and U.S. Pat. No. D 420,364 (the current inventors—Fischer and Jureski).

Through experimentation the inventors have shown that the above spray bar system can be improved by careful positioning of the apertures. In fact, the best mix of ancillary fuel and $N_2O$ is obtained when the ancillary fuel flows upward, and counter to, the regular fuel/air mix provided by the carburetor or throttle body. Thus, the inventors have discovered and made an improvement to existing technology that drives the stoichiometric mix of ancillary fuel/$N_2O$ to its peak performance point.

SUMMARY OF THE INVENTION

In its most basic form (prototype), the instant invention consists two stainless steel conduits mounted in a frame or plate taking the form of a square aluminum frame approximately 6¼ inches square (outside) with the inside dimensions being approximately ⅝-inch less and approximately ⅝-inch thick. The two conduits run from one side of the frame to other side (within the throat of the frame) at a mid point. The two conduits are vertically in-line (one over the other) and have a series of carefully machined (laser drilled) apertures. The ancillary fuel conduit is on the bottom and the nitrous-oxide (oxidizer) conduit is on the top.

There are approximately 30 apertures along a line on each side of the center line of each conduit for a total of 60 apertures per conduit. The conduits are positioned so that a fuel aperture is exactly opposite a matching gas aperture. Other models will have more or less apertures depending on manifold size, horsepower, engine size, etc.

In order to provide proper mixing, each line of apertures is positioned at a particular angle from the respective center line of the conduit. The best (or preferred) angle for the $N_2O$ apertures is 50 degrees to each side of center; whereas, the best (or preferred) angle for the fuel is 35 degrees to each side of center. Thus under the preferred circumstances, the line of $N_2O$ apertures is 90 to 100 degrees apart; whereas, the fuel apertures are 70 degrees apart.

As stated earlier, the ancillary fuel flows from the bottom conduit and enters the downward stream of the regular fuel/air mixture. The ancillary fuel does not enter the flow orthogonally (as in the prior art), but at a preferred 55 degrees, measured from the orthogonal counter to the fuel/air mixture flow. The gas, enters the fuel/air mixture flow in the same flow direction at a preferred angle of 35-degrees from the downward flow of the fuel/air mixture. In the prior art, the gas also flows downward.

Thus, because the ancillary fuel is moving upward against the fuel/air mixture and into the downward gas flow, perfect mixing occurs. The preferred offset angle (55 degrees in the counter direction as compared to the current art, which is orthogonal) means that the ancillary fuel and gas will mix together and enter the fuel/air mixture in the proper ratio. This extra fuel/gas can now pass through the intake manifold and be equally distributed to the cylinders. This results in smoother performance and more efficiency from the fuel/gas and fuel/air mixture in the engine.

BRIEF DESCRIPTION OF THE INVENTION

Figure 14:
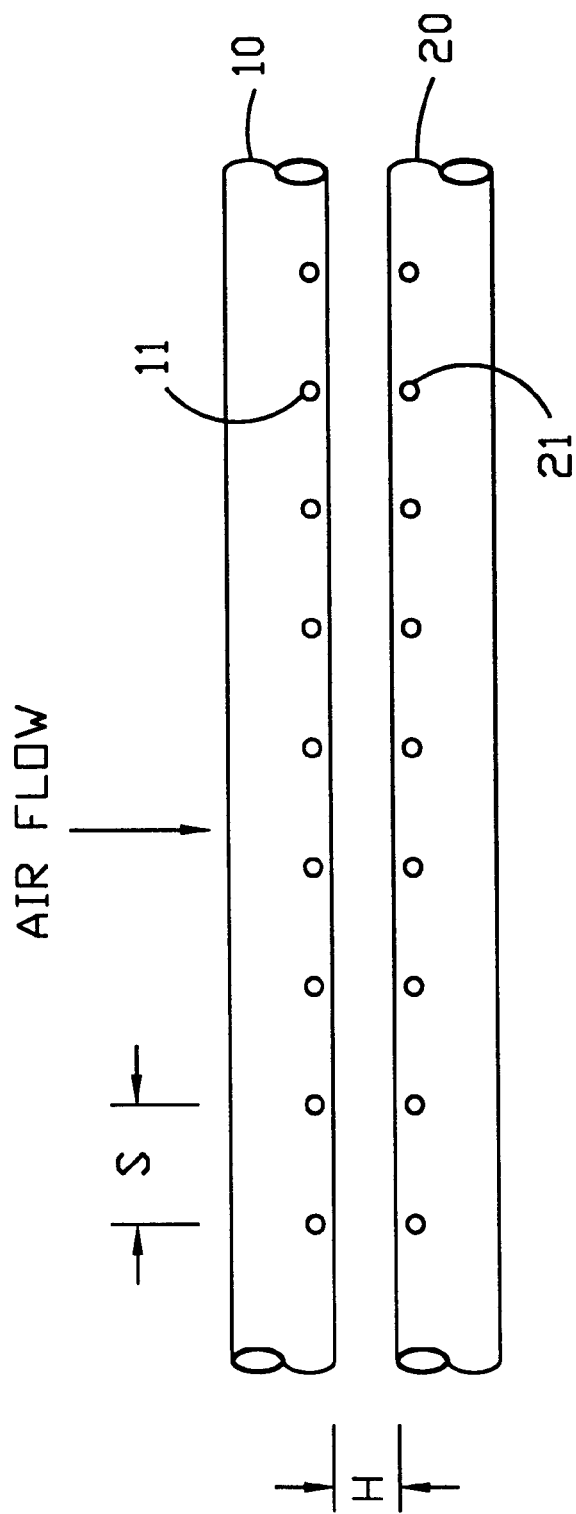

FIG. 14 more clearly shows that the ancillary fuel apertures are NOT orthogonal to the flow direction of fuel/air mixture.

Figure 9:
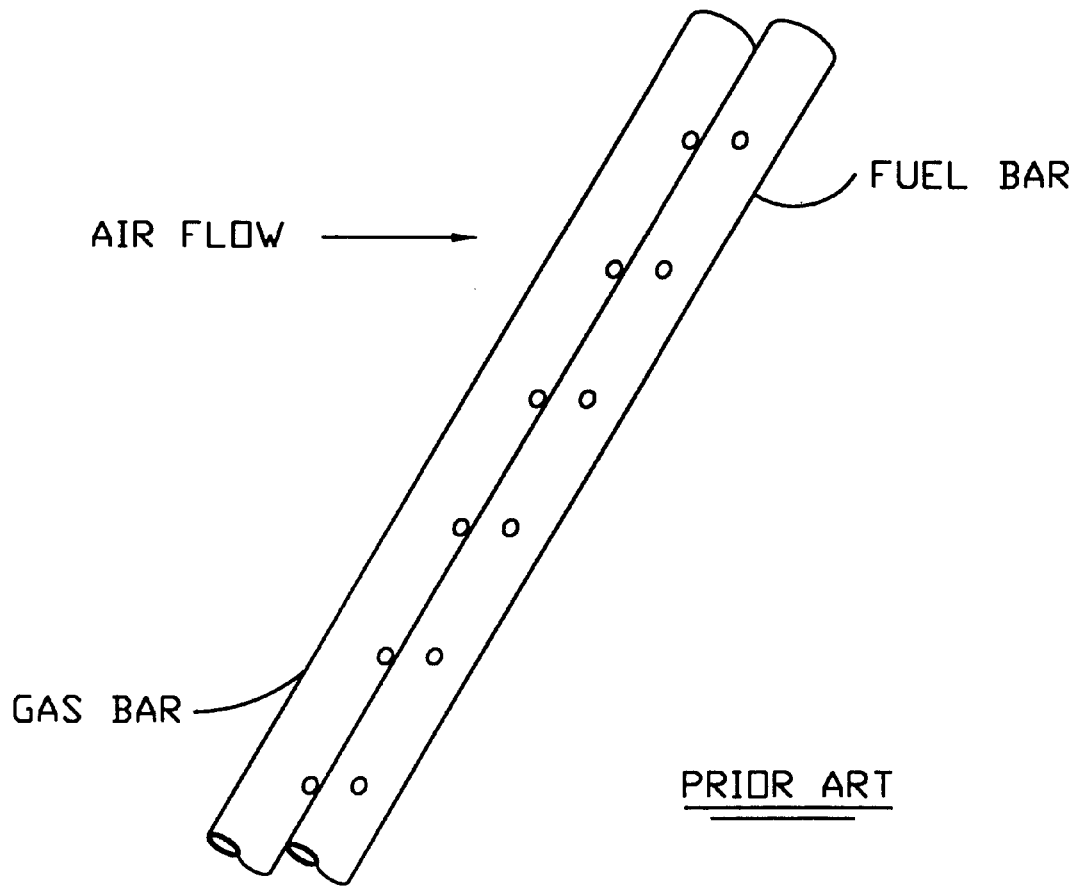
FIG. 9 is a close up view of the two conduits in the current art—again note the orthogonal fuel apertures and the close spacing between the two conduits. The gas apertures are shown and clearly opposite each of the fuel apertures.
Figure 15:
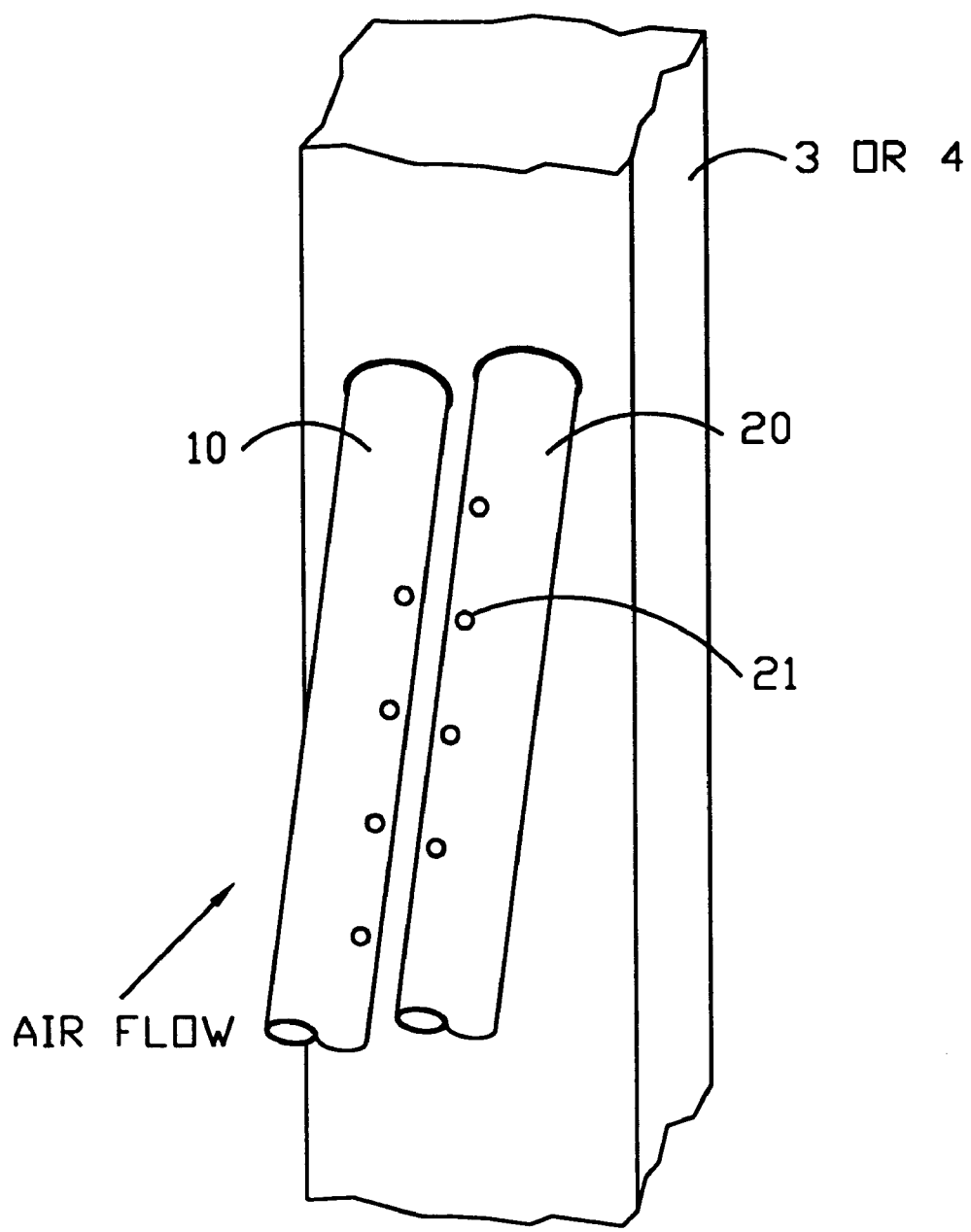

FIG. 15 is a close up view of the two conduits in the instant invention—again note the fuel apertures are not orthogonal to the fuel/air mixture and note the wider spacing between the two conduits (see FIG. 9). The $N_2O$ apertures are shown and are clearly opposite each of the fuel apertures.

Figure 16:
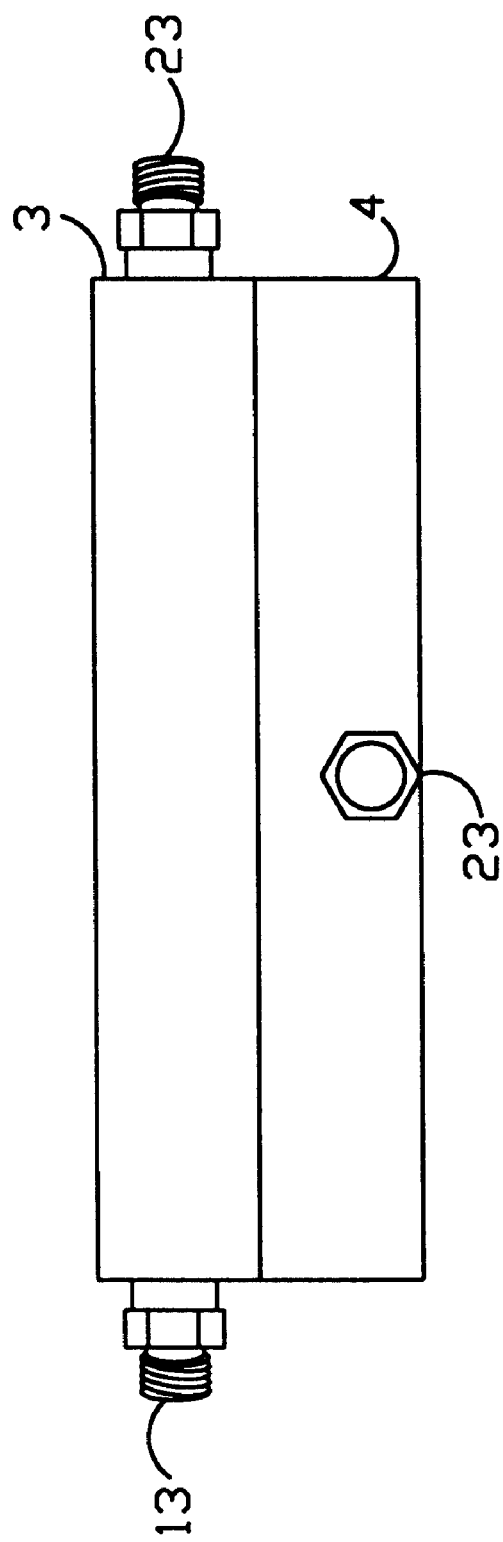

FIG. 16 shows an alternate arrangement in order to obtain crossed spray bars using two single pair spray bar plates stacked one on the other.

Figure 17:
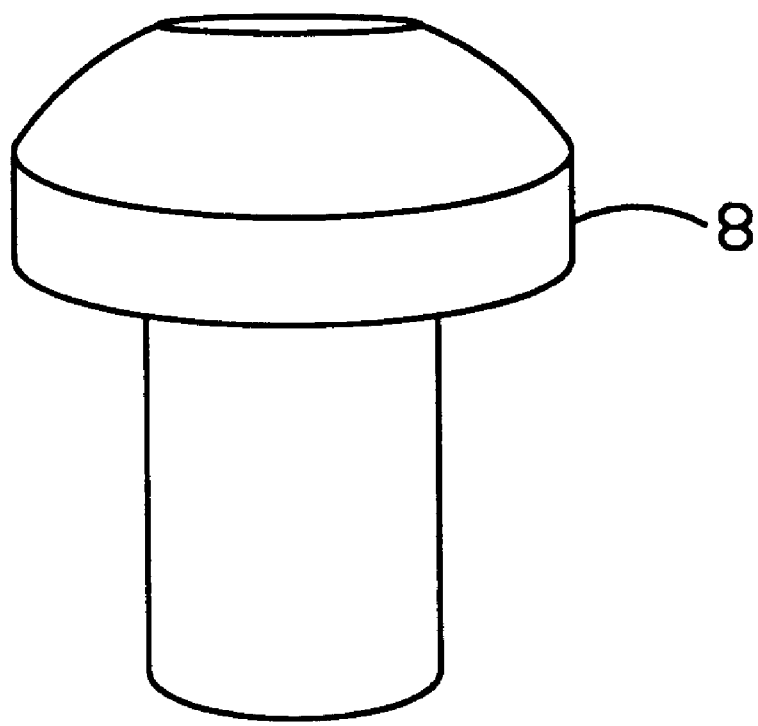

FIG. 17 is a laser-drilled jet used to adjust the flow of gas and ancillary fuel. The jet is placed in the gas or ancillary fuel fitting associated with the respective conduit. (See FIGS. 4 and 5)

Figure 11:
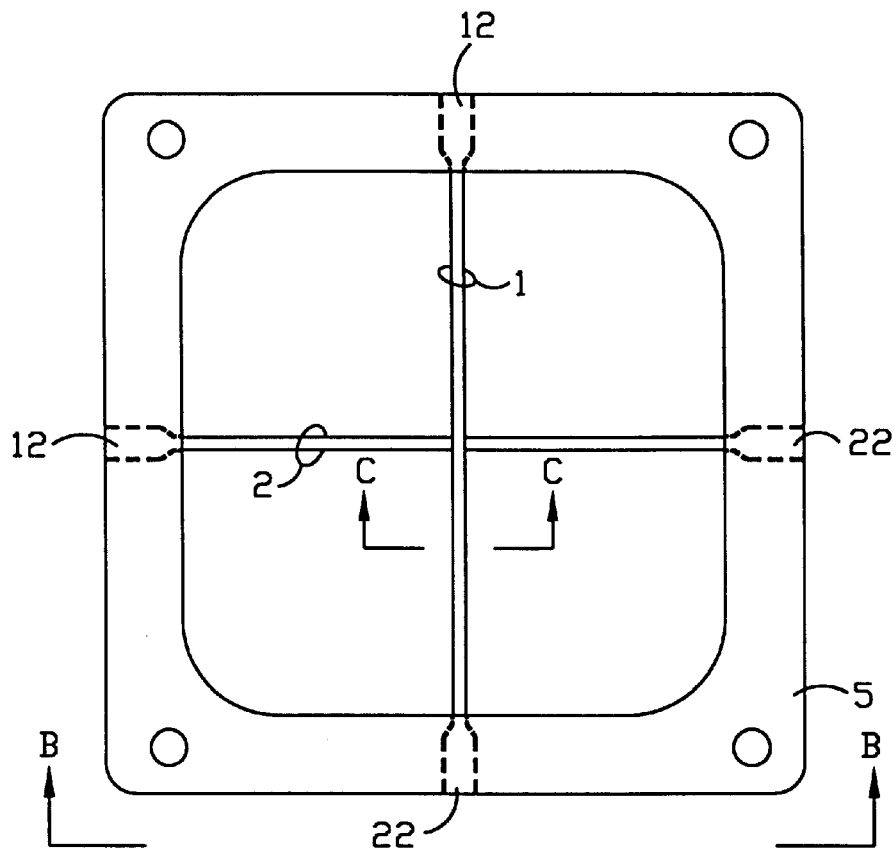
FIG. 11 shows the spray bar pair used in as "crossed set" in a plate.
Figure 18:
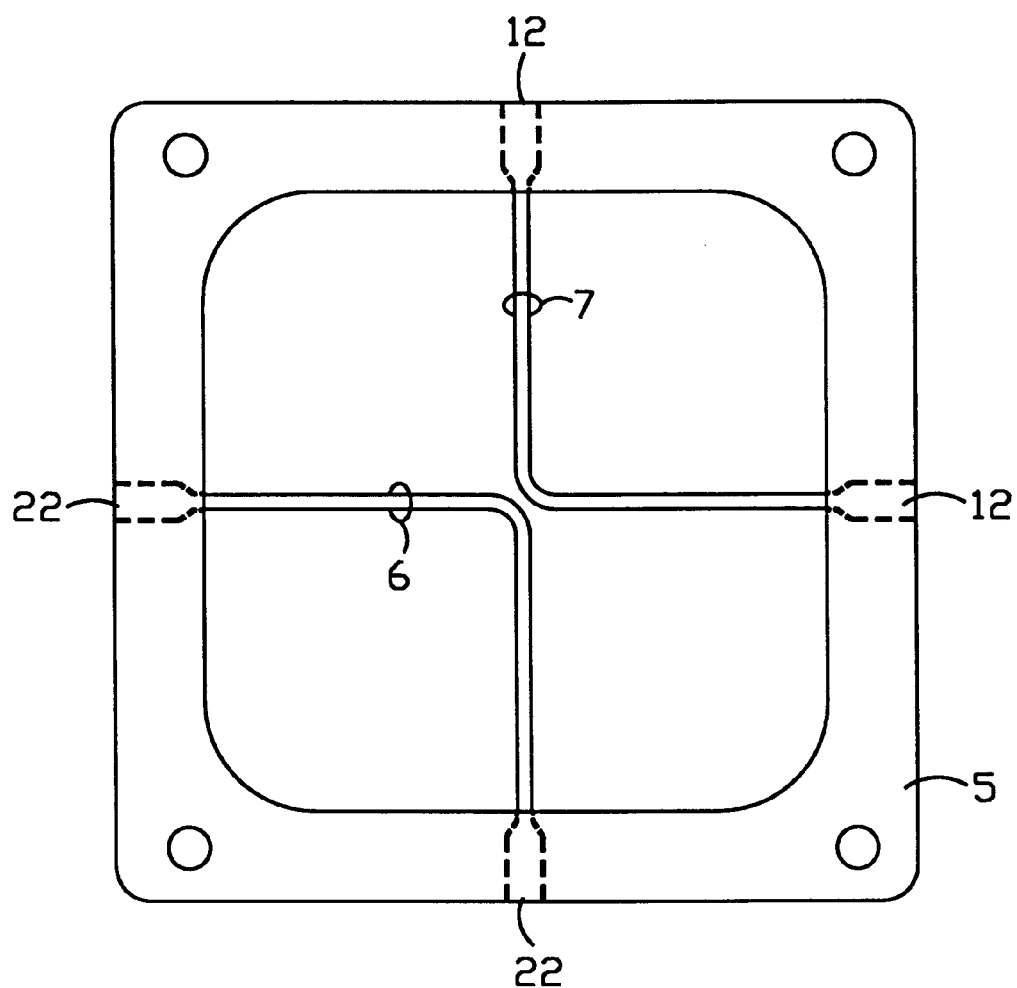

FIG. 18 is a modification of FIG. 11 in which the spray bar pair is bent to form an "EL" at the mid-point of a throat. The effect is to form a "crossed pair" except that the pair lies in the same plane.

DETAILED DESCRIPTION OF THE EMBODIMENT

Figure 7:
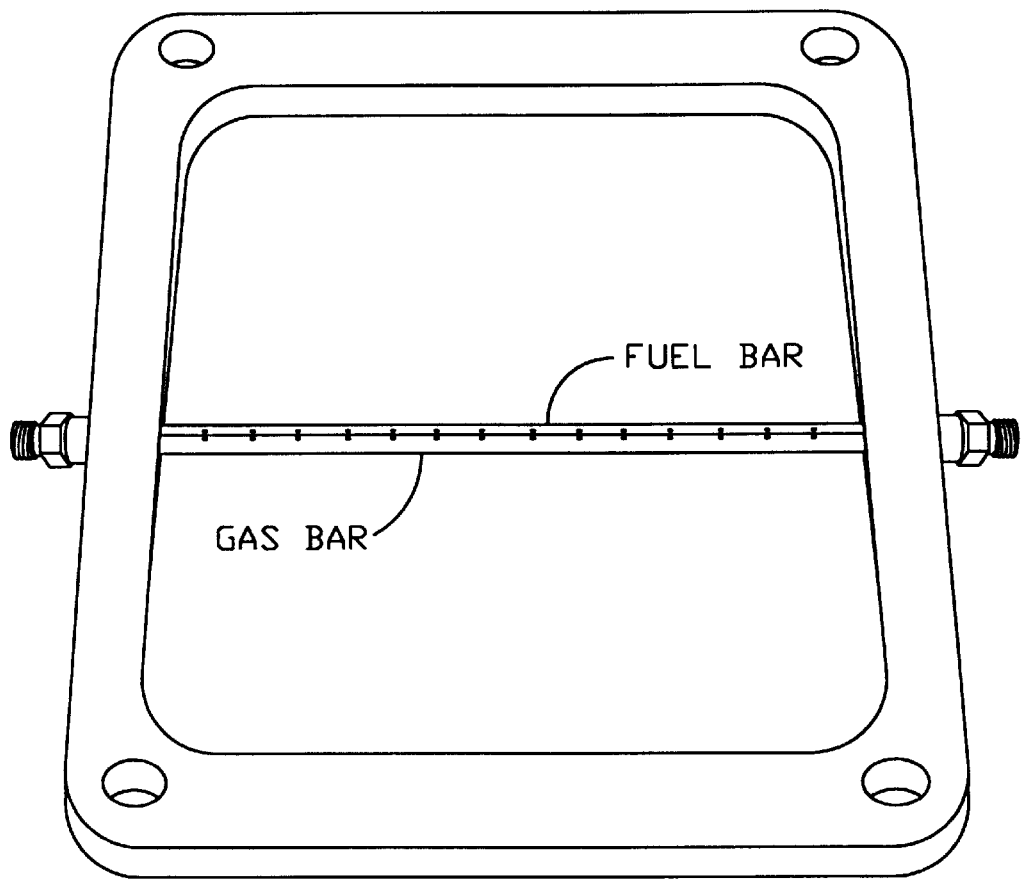
FIG. 7 shows the current and/or prior art spray bars in a plate.
Figure 8:
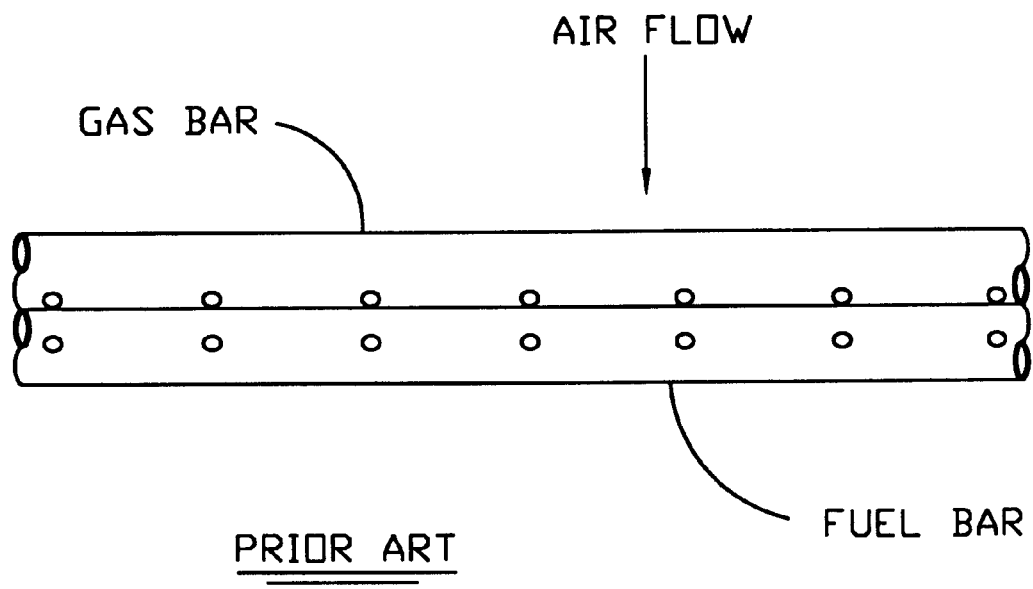
FIG. 8 shows the two conduits in the current art—note the orthogonal ancillary fuel apertures in the lower (fuel) conduit and the close relationship of the two spray bars.

The instant invention is shown in FIGS. 1, 2, 4, 6 and 10 through 15. The instant invention is shown mounted in a spray bar plate in FIGS. 10 and 11 which are similar to the prior art, shown in FIGS. 7 through 9 (although an example of a prior art 'crossed-set" is not shown—but see U.S. Pat. No. 5,839,418 incorporated by reference), in that the device consists of a frame, two conduits and associated fittings.

Figure 10:
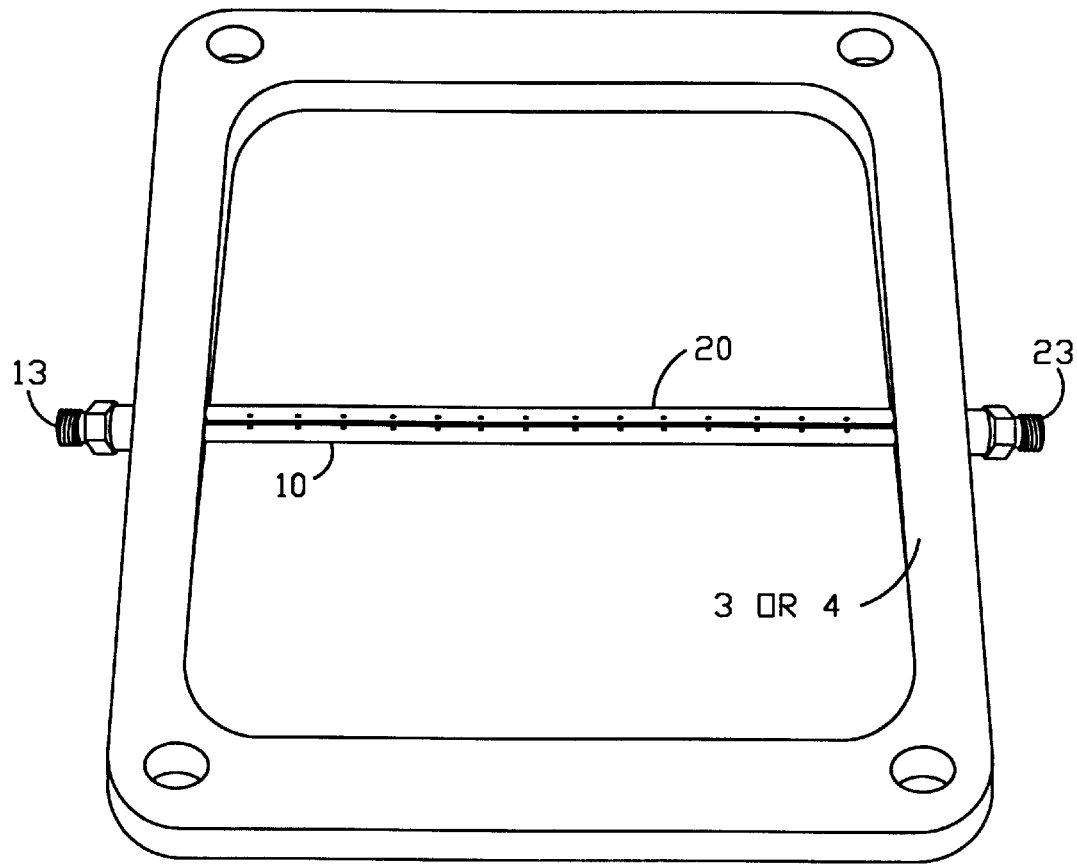
FIG. 10 is the instant invention shown as a single pair mounted in a spray bar plate note the relative positions of the spray nozzles (unlike the prior art) and the spacing between the bars.

Referring now to FIG. 10, the prototype of the instant device, which consists of a gas spray bar, 10, and a fuel spray bar, 20, was placed in a frame, 3, approximately 4 3/16-inches square on the outside with rounded corners. The throat of the frame (inside dimensions) is approximately 4⅞-inches square with the internal corners properly rounded. The prototype frame is designed to fit most standard intake manifolds. (Note all dimensions can be adjusted to meet design criteria set by different manifolds; thus, dimensions should NOT be construed as a limitation. Dimensions are given to explain the best mode and best embodiment for the instant invention.) Finally, the plate is approximately ⅝-inches thick; whereas, "crossed-set" version plate, 5, (FIG. 11) would be approximately twice as thick.

As shown in FIG. 10 (or 11), the instant invention consists of a conduit pair comprised of a gas bar, 10, and a fuel bar, 20. The conduit pair (like the prior art—FIG. 7) runs between two sides of the plate in the center. One end of the conduit terminates within a terminating aperture (not shown) in the spray bar plate; whereas, the other end terminates within and against its associated fitting (see FIG. 4). The gas bar, 10, terminates its gas connector, 13, and the fuel bar, 20, terminates in its fuel connector, 23. Each connector screws into its respective port, 12 or 22.

Figure 4:
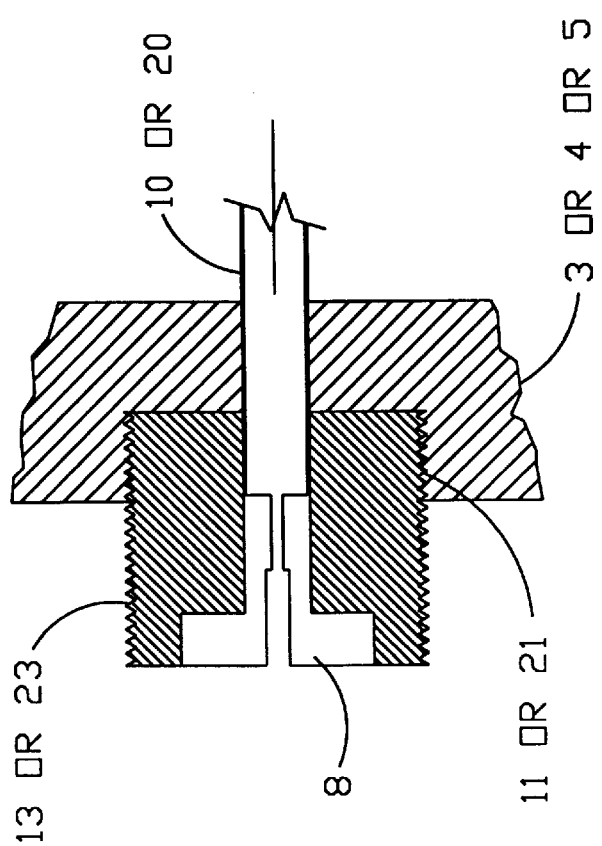
FIG. 4 shows a metering jet installed in the instant invention—note how the jet fits within the fitting and against the conduit so that no expansion pockets appear.

The associated connector and port is different to the prior art in which the conduit terminate (see FIG. 4). Because the prior art was somewhat sloppy in manufacturing and did not realize what the effect poor or sloppy techniques would do allowed an expansion pocket (see FIG. 5) to form within each termination. Thus, in the instant invention care is taken to make certain that each spray bar, 10 or 20, terminates within the connector, 13 or 23, and not within the port 11 or 21 as in the prior art.

The spray bar conduit is preferably manufactured from 0.190-inch OD, D: 0.01±wall, w, stainless steel: it would be possible to use other materials that are capable of handling the pressure and capable of precision machining. Within the throat of the prototype plate, each conduit is approximately 4⅞ inches long. The overall length, l, must be longer; for, each conduit terminates in the opposite wall—requiring length lx—and extends through a wall to its associated fitting—requiring length le. The associated fitting is then attached to fuel or gas, as the case may be.

Figure 1:
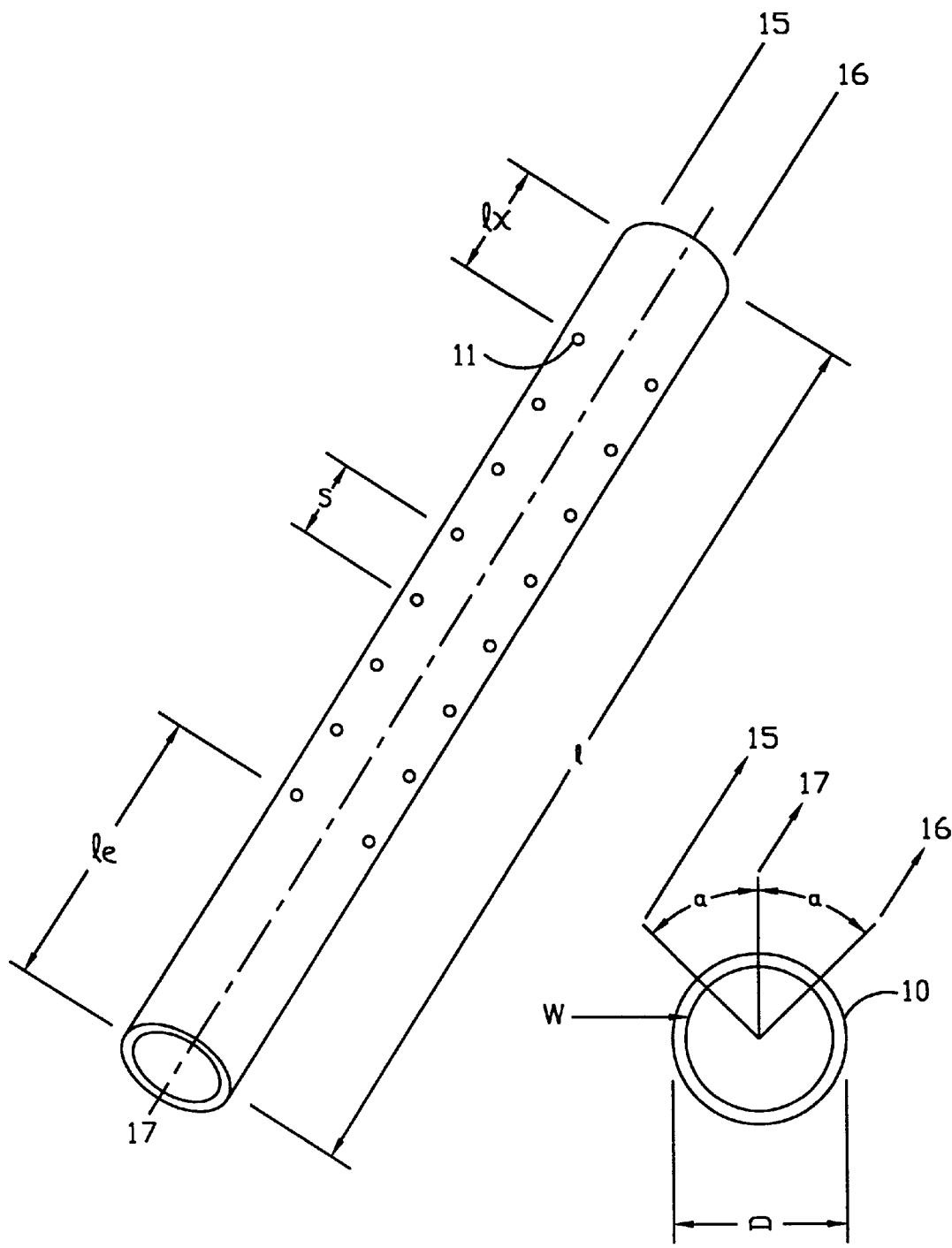
FIG. 1 is an isometric view of the layout of the preferred nitrous-oxide (gas) conduit apertures of the instant device.
Figure 2:
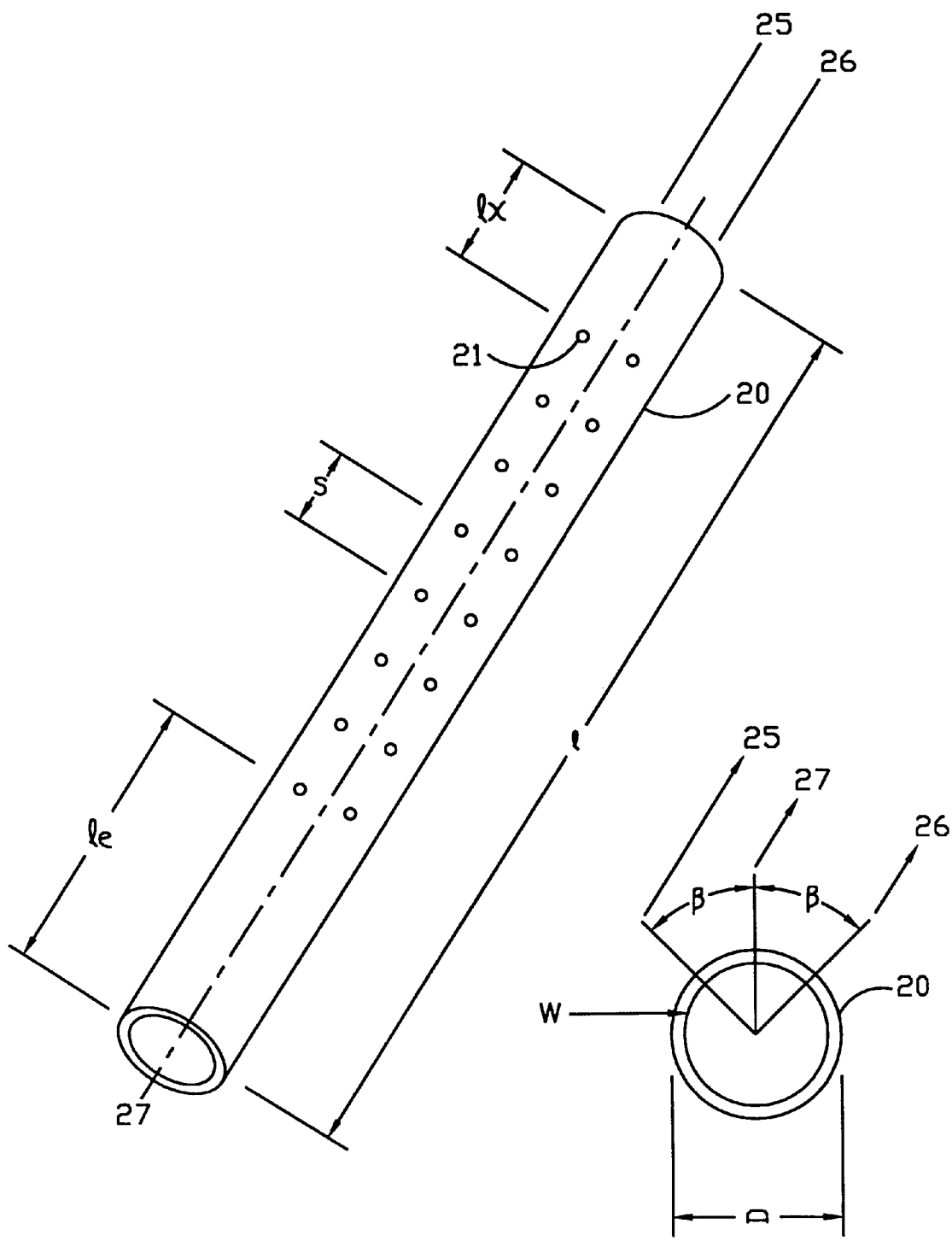
FIG. 2 is an isometric view of the layout of the preferred fuel conduit apertures of the instant device.

Each conduit has a plurality of apertures, 11 (gas apertures) and 21 (fuel apertures), falling on gas aperture lines 15 and 16 or fuel aperture lines 25 and 26, as shown in FIGS. 1 and 2. The two lines of apertures are located either side of the top and bottom center of the fuel conduit and gas conduit respectively. The apertures are approximately 0.021-inches in diameter, d, and approximately 0.228-inches apart, s. (The actual aperture diameter can range over $0.015 < d < 0.03$ and the actual spacing can range over $0.010 < s < 0.5$) The two conduits are themselves spaced approximately ¼-inch apart from centerline to centerline. This leaves approximately ⅛-inches, H, between the outside walls of the two conduits (see FIGS. 6, 12, 14, and 15); however, H may vary between 0.001 to 0.20-inches. The prior art has the conduit pair(s), more or less, touching each other with only several thousandths (inch) distance between the outside walls (see FIGS. 8 and 9). The prior art plates are slightly thinner; whereas, with the instant device the plate must be thicker because the instant device spreads the two conduits further apart from each other.

FIG. 1 clearly shows that each of the two lines of apertures, 15 and 16 are located α-degrees to each side of the bottom centerline of the gas conduit. The bottom centerline may be considered as a line formed on the surface of the gas conduit that falls nearest to the associated fuel conduit; thus, forming a gas near position line. FIG. 2, on the other hand, shows the two lines of apertures, 25 and 26 located β-degrees to each side of the top centerline of the ancillary fuel conduit. The top centerline may be considered as a line formed on the surface of the fuel conduit that falls nearest to the associated gas conduit; thus, forming a fuel near position line. In the prototype version the angle α (gas angle) was set at 50-degrees and the angle β (fuel angle) was set at 35-degrees. FIG. 1 is shown wrong for purposes of illustration, because up is really in the other direction when the bar is placed within the spray bar plate.

Figure 3:
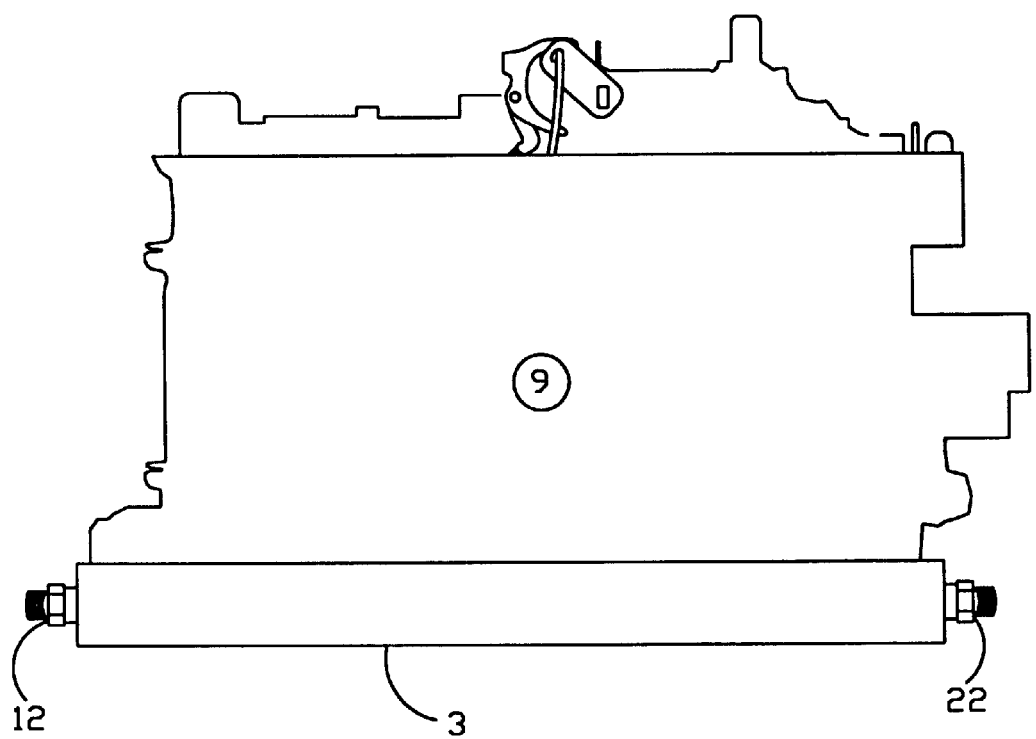
FIG. 3 shows a spray bar plate, adapted to hold the instant invention in position under a throttle body or carburetor.

FIG. 3 is a side elevational view of a spray bar plate, 3, (containing the instant invention or prior art) installed underneath a standard carburetor/throttle valve, 9. Thus, design dimensions for the spray bar plate vary because the manufacturer of the intake manifold, carburetor/throttle sets dimensions. Thus, the length, l, of the conduit must vary, and several sizes of spray bar plate and associated conduit pair(s) would (will) be required to satisfy the consumer.

Figure 5:
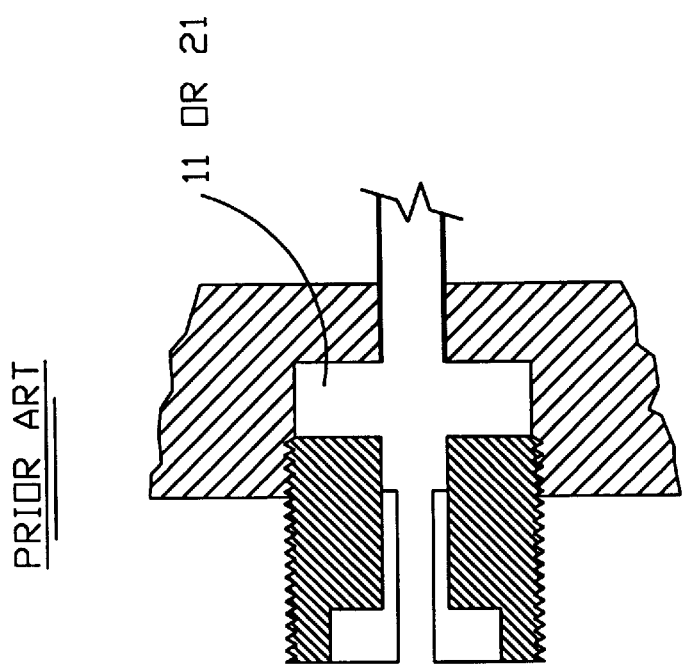
FIG. 5 shows the prior art metering jet—note the expansion pocket between the jet and the conduit.

The dimensions given in FIGS. 1 and 2, work for most performance enhanced situations. Different engines and manifolds will require different operating conditions. It is known in the industry that these conditions can be met by several models of spray bar plate (i.e. external dimensions—larger or smaller—to fit the manifold) that would require different lengths of conduit within the plate. Other adjustments such as tuning for ancillary fuel flow and gas are made by using various sizes of metering jets as shown in FIGS. 4, 5, and 15. It is well understood in the art how to size these jets.

The instant invention is concerned with lateral distribution, radial position, and size of the apertures in each of the conduits forming the spray bar pair (conduit pair). The alignment (radial position) of the apertures with respect to the intake manifold normal flow (normal being defined as air/fuel mix supplied by standard carburetors) is critical to proper mixing. The normal flow is downward past the spray bars. The prior art injected the ancillary fuel at right angles (orthogonal) to the normal flow (i.e., the angle β was fixed at 90-degrees), and the gas was injected immediately above the ancillary flow. (In the prior art gas spray bar, the angle is not orthogonal and is less than 90-degrees.) The instant device and the prior art align the gas and ancillary fuel apertures immediately opposite each other.

Figure 6:
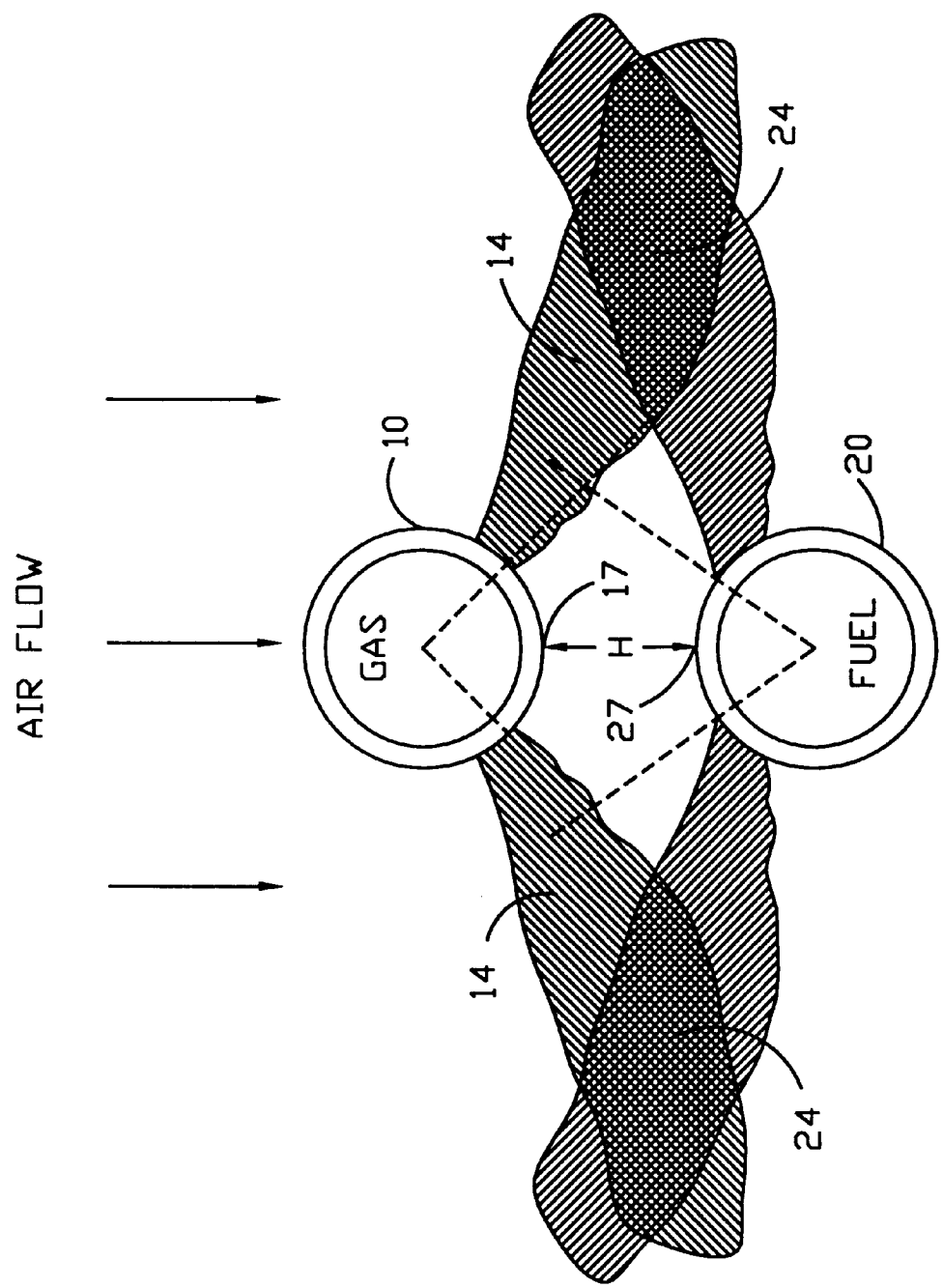
FIG. 6 shows the alignment of the fuel and gas apertures of the instant invention and illustrates the fuel and gas spray patterns.

In the instant device, the ancillary fuel is injected upwards (counter to the normal flow). The in-rushing normal fuel/air mixture turns the injected ancillary fuel downwards, due strictly to air flow. The further the distance from the conduit, the further is the injected fuel displaced downward such that by the time the ancillary fuel reaches the walls of the throat it is approximately horizontal (see item 24 in FIG. 6). At the same time, due to both the separation of the conduit and the angle of the gas and ancillary fuel apertures with respect to each other, the gas atomizes the ancillary fuel. (See FIG. 6.) This means that the gas, 14 in FIG. 6, is properly mixed with the injected fuel causing the ancillary fuel and gas mixture to enter the normal fuel/air mixture evenly. In the case of the prior art, the injected ancillary fuel is driven away from the injected gas by the normal fuel/air mixture flow that results in less atomizing of the ancillary fuel and less mixing with the normal air/fuel mixture. Thus, it can be seen that angles α and β are critical and must be chosen carefully.

The preferred angle for the gas aperture is 50 degrees either side from vertical as measured parallel to and with the flow of the regular fuel/air mixture (see FIGS. 1 and 6). It has been observed that angles from about 30 to 70 degrees will work, but not as effectively as the preferred angle. The preferred angle for the fuel aperture is 35 degrees from vertical as measured parallel to and counter to the flow of the regular fuel/air mixture (see FIGS. 2 and 6). It has been observed that angles from about 20 to 60 degrees will work, but not as effectively as the preferred angle.

As show in the Figures, the preferred aperture size is 0.021 inches and the spacing is 0.228 inches when used in 0.01-inch wall conduit having an outside dimension of 0.190-inches.

Figure 12:
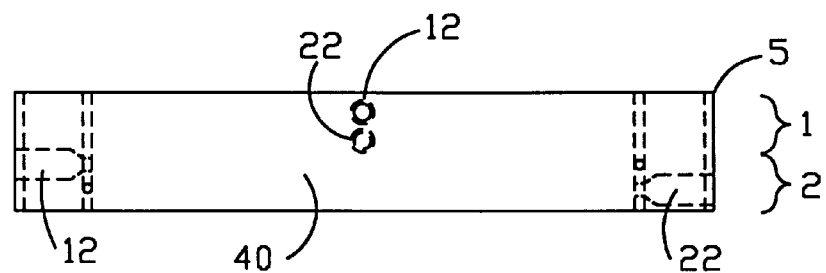
FIG. 12 is a side view of the plate taken at B—B of FIG. 11.
Figure 13:
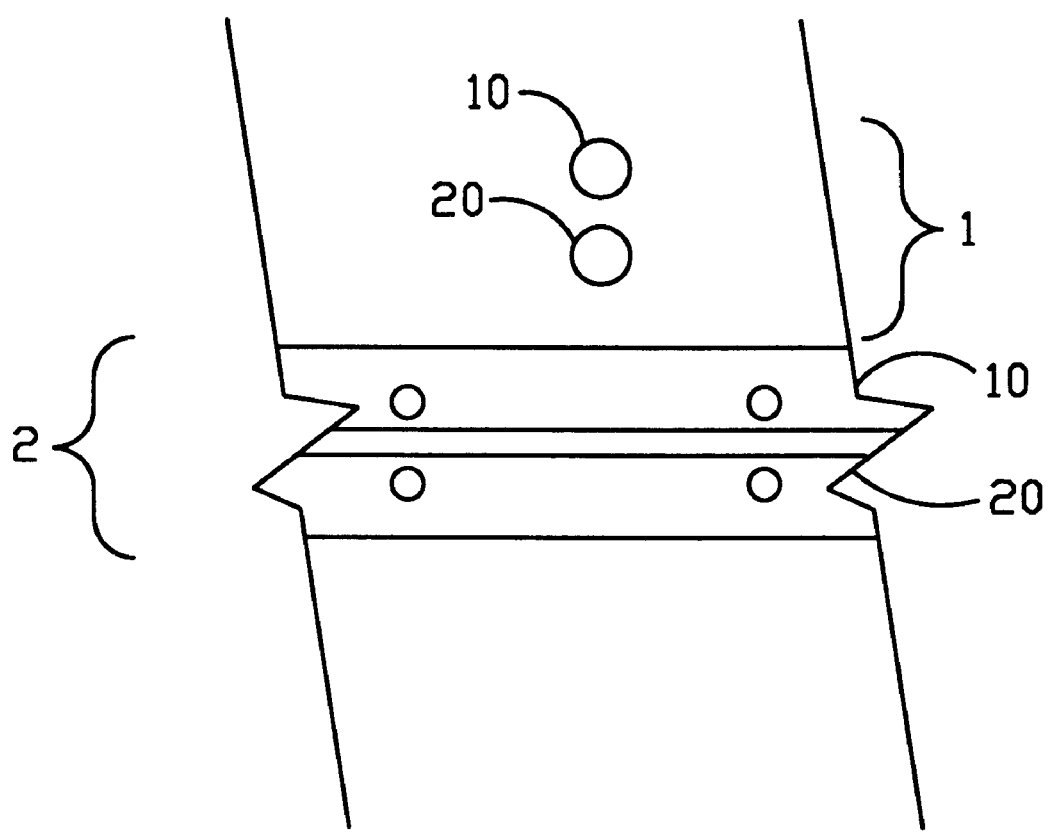
FIG. 13 is a side view of the crossed bars taken at the C—C of FIG. 11.

FIG. 10 shows a single spray bar pair of the instant invention installed in a spray bar plate. It is possible to obtain even better mixing by using a "crossed-set" of spray bar pairs as shown in FIGS. 11 through 13. A first pair, 1, is placed over a second pair, 2, and installed in a spray bar plate. The plate must be wider than the plate of FIG. 10. Two single spray bar pairs may be employed as shown in FIG. 16. A first single plate, 3, would be installed over a second single plate, 4, in such a manner as to cross the spray bar pairs. A better version involves a "bent" set of spray pairs as shown in FIG. 18. A spray bar pair is bent at 90 degrees to itself at the approximate mid-point. Two such "bent" pairs, 6 and 7, are then installed in a spray bar plate. This results in a "crossed-bar" set; however, each cross in the same plane.

This method of use results in a thinner spray bar plate, which is an advantage in the tight spaces with an engine compartment. Terminations to the spray bars pairs would be slightly different in that a connection to an associated conduit would be made on each quadrant of the spray bar plate.

Other variations are possible, for example many intake manifolds are "quad" based, i.e., four holes leading to four passages entering the engine. Therefore, four such improved spray bar devices could be mounted in a spray plate such that they form crosses over each of the quad-inlet ports on the manifold. This approach would ensure the maximum fuel/gas mix for each quadrant. This concept may be expanded to other larger intake manifold systems using even more intake passages.

The dimensions given in this disclosure are set by design criteria based on the intake manifold on which the device may be used. An adjustment in dimensions to meet the varying sizes of manifolds is considered to be an important part of this disclosure and readily follows from the material disclosed. Other changes may be made in aperture diameter and separation distance. For example, the diameter could be reduced and the number of apertures increased. This itself would fall under this disclosure. The fuel injection angle has been found to be most efficient at 35 degrees with the associated 50 degree gas injection angle. However, as stated, these angles can be varied and still fall within the limits of this disclosure. The number of apertures in each bar is set by the spacing, s, and the length of the bar within the throat given by the equation l−[lx+le]. Remember that lx and le will be set by the width of the spray bar plate and the throttle/manifold/carburetor throat will set l. These particular dimensions are set by various manufactures; however, the dimensions given for the prototype device will fit a majority of applications.

What has been disclosed is the best mode and best embodiment. The choice of hole diameter and spacing given in this disclosure produces the best results under the highest number of operating conditions. Hole spacing and diameter is affected by the diameter of the conduit. Some discussion has been attempted as to the "expansion pocket" caused by mis-fitting a metering jet in a fitting. The expansion pockets should be avoided because they can cause problems in fuel mixing due to super cooling caused by the pocket.

Item Listing

Supplied as an Aid to the Examiner

1 First Spray Bar Pair
2 Second Spray Bar Pair
3 Spray Bar Plate
4 Auxiliary Spray Bar Plate
5 Crossed-Bar Spray Bar Plate
6 First Bent Spray Bar Pair
7 Second Bent Spray Bar Pair
8 Laser-drilled jet
9 Carburetor/Throttle Valve
10 Gas Bar
11 Gas Aperture
12 Gas Port
13 Gas Connector
14 Gas Spray Pattern
15 Gas Aperture Line
16 Gas Aperture line
17 Gas Near Position Line
18
19
20 Fuel Bar
21 Fuel Aperture
22 Fuel Port
23 Fuel Connector
24 Fuel Spray Pattern
25 Fuel Aperture Line
26 Fuel Aperture Line
27 Fuel Near Position Line
28
29
Symbols
d Aperture Diameter
D Bar OD
α Gas Angle
β Fuel Angle
le Connection End Length
lx Terminal End Length
l Total Length
w Bar Wall Thickness
s Aperture spacing
H Bar Spacing

We claim:

1. An improved spray bar pair for mixing fuel and oxidizer for introduction into the intake manifold of an internal combustion engine comprising:

a fuel bar wherein said fuel bar is formed from a conduit having an outside and an inside;

a gas bar wherein said gas bar is formed from a conduit having an outside and an inside;

wherein said gas bar has an axial gas near position line and two gas aperture lines each of said lines falling on said outside of said gas bar;

wherein said fuel bar has an axial fuel near position line and two fuel aperture lines each of said lines falling on said outside of said fuel bar;

said gas bar and said fuel bar being positioned one over the other, thereby forming a spray bar pair, such that said gas near position line and said fuel near position line are parallel to each other that said near position lines are separated by a distance ranging from 0.001-inches to 0.20-inches as measured linearly from said gas near position line to said fuel near position line;

means for mounting said spray bar pair near the intake manifold while maintaining said separation distance;

wherein each of said gas aperture lines are positioned axially along said outside of said gas bar at a gas angle falling within the range 30 degrees to 70 degrees as measured circumferentially from said gas near position line to each of said gas aperture lines;

wherein each of said fuel aperture lines are positioned axially along said outside of said fuel bar at a fuel angle falling within the range 20 degrees to 60 degrees as measured circumferentially from said fuel near position line to each of said fuel aperture lines;

a plurality of gas spray apertures each thereof lying along one or the other of said gas aperture lines and forming a conduit between said inside and said outside of said gas bar; and, a plurality of fuel spray apertures each thereof lying along one or the other of said fuel aperture lines and forming a conduit between said inside and said outside of said fuel bar.

2. The spray bar pair of claim 1 wherein each of said gas apertures and each of said fuel apertures has a diameter within the range 0.015-inches to 0.030-inches.

3. The spray bar pair of claim 2 wherein each of said gas apertures and each of said fuel apertures is separated by a separation distance within the range 0.010-inches to 0.500-inches.

4. The spray bar pair of claim 3 wherein said spray bar pair has two ends and wherein said mounting means comprises a spray bar plate having one or more gas ports, one or more fuel ports, and a plurality of terminating apertures into each of which an associated gas bar or fuel bar may be inserted and in which one end of each fuel bar terminates within a fuel connector within said fuel port whereas said other end thereof terminates in an associated terminating aperture within said spray bar plate and in which one end of each gas bar terminates within a gas connector within said gas port whereas said other end thereof terminates in an associated terminating aperture within said spray bar plate.

5. The spray bar pair of claim 4 wherein said mounting means has two gas ports, two fuel ports, and four terminating apertures.

6. The spray bar pair of claim 4 wherein said mounting means has four gas ports, four fuel ports, and eight terminating apertures.

7. The spray bar pair of claim 3 wherein said distance between said near position lines is 0.125-inches, wherein said gas angle is 50 degrees, said fuel angle is 35 degrees, each of said gas and fuel apertures have a diameter of 0.021-inches, and said separation distance is 0.228-inches; and, wherein all measurements are made within normal machine standards.

8. The spray bar pair of claim 7 wherein said conduit is stainless steel having an outer diameter of 0.190-inches.

9. The assembly of claim 7 wherein said fuel bar is a bent fuel bar and said spray bar is a bent gas bar and wherein said spray plate has a center with two fuel ports and two associated terminating apertures for receiving a bent fuel bar and two gas ports and two associated terminating apertures for receiving a bent gas bar thereby forming an cross in the center of the spray bar plate.

10. The spray bar pair of claim 3 wherein said conduit is stainless steel having an outer diameter ranging between 0.125-inches and 0.25-inches.

11. An improved dual spray bar assembly for mixing fuel and oxidizer for introduction into the intake manifold of an internal combustion engine comprising:

a fuel bar wherein said fuel bar is formed from a metal conduit having an outside, an inside, and two ends;

a gas bar wherein said gas bar is formed from a metal conduit having an outside, an inside, and two ends;

wherein said gas bar has an axial gas near position line and two gas aperture lines each of said lines falling on said outside of said gas bar;

wherein said fuel bar has an axial fuel near position line and two fuel aperture lines each of said lines falling on said outside of said fuel bar;

said gas bar and said fuel bar being positioned one over the other, thereby forming a spray bar pair, such that said gas near position line and said fuel near position line are parallel to each other that said near position lines are separated by a distance ranging from 0.010-inches to 0.20-inches as measured linearly from said gas near position line to said fuel near position line;

a spray bar plate having one or more gas ports, one or more fuel ports, and a plurality of terminating apertures into each of which an associated gas bar or fuel bar may be inserted and in which one end of each fuel bar terminates within a fuel connector within said fuel port whereas said other end thereof terminates in an associated terminating aperture within said spray bar plate and in which one end of each gas bar terminates within a gas connector within said gas port whereas said other end thereof terminates in an associated terminating aperture within said spray bar plate mounting said spray bar pair near the intake manifold while maintaining said separation distance;

wherein each of said gas aperture lines are positioned axially along said outside of said gas bar at a gas angle falling within the range 30 degrees to 70 degrees as measured circumferentially from said gas near position line to each of said gas aperture lines;

wherein each of said fuel aperture lines are positioned axially along said outside of said fuel bar at a fuel angle falling within the range 20 degrees to 60 degrees as measured circumferentially from said fuel near position line to each of said fuel aperture lines;

a plurality of gas spray apertures each thereof lying along one or the other of said gas aperture lines and forming a conduit between said inside and said outside of said gas bar wherein each of said gas apertures has a diameter within the range 0.015-inches to 0.030-inches and are separated by a separation distance within the range 0.010-inches to 0.500-inches; and, a plurality of fuel spray apertures each thereof lying along one or the other of said fuel aperture lines and forming a conduit between said inside and said outside of said fuel bar wherein each of said fuel apertures has a diameter within the range 0.02-inches to 0.03-inches and separated by a separation distance within the range 0.20-inches to 0.30-inches.

12. The assembly of claim 11 wherein said distance between said near position lines is 0.125-inches, wherein said gas angle is 50 degrees, said fuel angle is 35 degrees, each of said gas and fuel apertures have a diameter of 0.021-inches, and said separation distance is 0.228-inches; and, wherein all measurements are made within normal machine standards.

13. The assembly of claim 11 wherein said metal conduit is stainless steel having an outer diameter ranging between 0.125-inches and 0.25-inches.

14. The assembly of claim 12 wherein said metal conduit is stainless steel having an outer diameter of 0.190-inches.

15. The assembly of claim 11 wherein said fuel bar is a bent fuel bar and said spray bar is a bent gas bar and wherein said spray plate has a center with two fuel ports and two associated terminating apertures for receiving a bent fuel bar and two gas ports and two associated terminating apertures for receiving a bent gas bar thereby forming an cross in the center of the spray bar plate.

16. The assembly of claim 11 wherein said spray bar plate has quadrants and four fuel ports and four associated terminating apertures for receiving a fuel bar and four gas ports and four associated terminating apertures for receiving a gas bar wherein said bars form a cross in each quadrant.

* * * * *